MONEUSE & DUPARQUET.
Coffee Pot.

No. 95,599.

Patented Oct. 5, 1869.

Witnesses:
Chas H Smith
Geo. T. Pinckney

Inventors:
E. Moneuse
L. Duparquet
per L. W. Serrell atty

United States Patent Office.

ELIE MONEUSE AND LOUIS DUPARQUET, OF NEW YORK, N. Y.

Letters Patent No. 95,599, dated October 5, 1869.

COFFEE-POT.

The Schedule referred to in these Letters Patent and making part of the same.

*To all whom it may concern:*

Be it known that we, ELIE MONEUSE and LOUIS DUPARQUET, of the city and State of New York, have invented and made a new and useful Improvement in Coffee-Pots; and we do hereby declare the following to be a full, clear, and exact description of the said invention, reference being had to the annexed drawing, making part of this specification, wherein—

Figure 1:
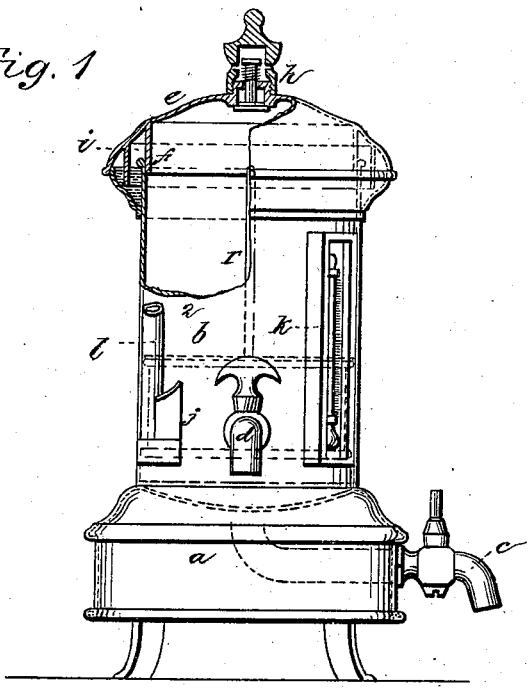
Figure 2:
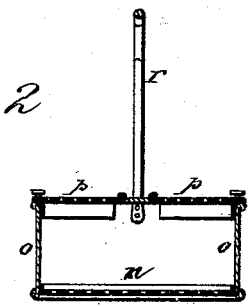

Figure 4 is an elevation of the coffee-pot, with a portion of the case broken open; and Figure 2 is a section of the coffee-holder detached.

Similar letters denote the same parts.

Coffee-pots have before been made with strainers for holding the coffee, so that the hot water will be poured through the same, but these are not adapted to the lowering of the strainer into the coffee liquid, if there is but a small quantity of said liquid.

Bags and floating coffee-holders have also been used, but they do not force the hot water to pass through the mass of ground coffee as the former is poured into the coffee-pot.

Our invention consists in a movable foraminous coffee-holding piston, fitting the interior of the coffee-pot sufficiently tight to cause the hot water to pass through the piston and the coffee that it contains.

This coffee-holding piston can be placed at any desired point in the coffee-pot, so that the coffee can always remain in the liquid, or it may be drawn up or down to suit the circumstances.

If the coffee-holding piston remained in the liquid, the coffee might become thick. If the piston is removed and hot water introduced, the piston and coffee can then be lowered into the same. The entire coffee grounds can be removed with promptness or they can be suspended above the liquid coffee in said vessel, if desired, thus greatly facilitating the production of the best quality of coffee.

In the drawing—

*a* represents the base of the coffee-pot;

*b*, the cylinder, with a bottom, forming the receptacle for the liquid coffee;

*c* is a sediment cock, for drawing off the thicker or second quality coffee; and

*d* is a cock, some little higher up, for drawing off the liquid coffee.

At the top of the coffee-pot is a flange, for receiving water in the annular trough around the coffee-holder *b*, and *e* is the cover with the interior flange *f* and exterior flange *i*, to set around the top of the vessel *b*, and retain any vapors and aroma, and return them to the coffee as they condense on the under side of the cover, *e*.

The valve *h* admits air as the coffee runs out.

In the side of the vessel *b* a thermometer is introduced, as at *k*, to denote the temperature of the contents, and a glass tube, *l*, is also employed, the same communicating at the bottom into the vessel *b*, and at the side of the glass tube numbers are stamped upon the vessel *b*, to denote the number of gallons, pints, or other measures of liquid coffee there may be in the coffee-pot.

The glass tube may be open at its upper end to allow it to be cleaned.

The movable foraminous coffee-holding piston is formed with the bottom *n*, sides *o*, and lids *p*, that are hinged, so as to be lifted in introducing or removing the ground coffee.

The edges of this piston fit the interior of the coffee-pot sufficiently to prevent much water passing between the piston and the cylinder *b*, and cause the same to pass through the perforations of the piston, and thereby extract from the ground coffee its properties.

The bail or handle *r* allows the piston to be lifted up or lowered down as desired.

What we claim, and desire to secure by Letters Patent, is—

1. The movable foraminous coffee-holding piston, formed with the bottom *n*, lids *p*, sides *o*, and provided with a handle, in combination with the coffee-holding cylinder *b*, into which said piston fits, as and for the purposes set forth.

2. The thermometer *k*, glass-tube *l*, and divisions applied to and combined with the coffee-holding cylinder *b*, in the manner and for the purposes set forth.

In witness whereof, we have hereunto set our signatures, this 22d day of June, A. D. 1869.

ELIE MONEUSE.
LOUIS DUPARQUET.

Witnesses:
W. H. MELICK,
GEORGE SIMONS.